E. SCHNEIDER.
ROAD WHEELED UNIT FOR ARTILLERY AND FOR OTHER PURPOSES.
APPLICATION FILED SEPT. 13, 1918.

1,335,759.

Patented Apr. 6, 1920.

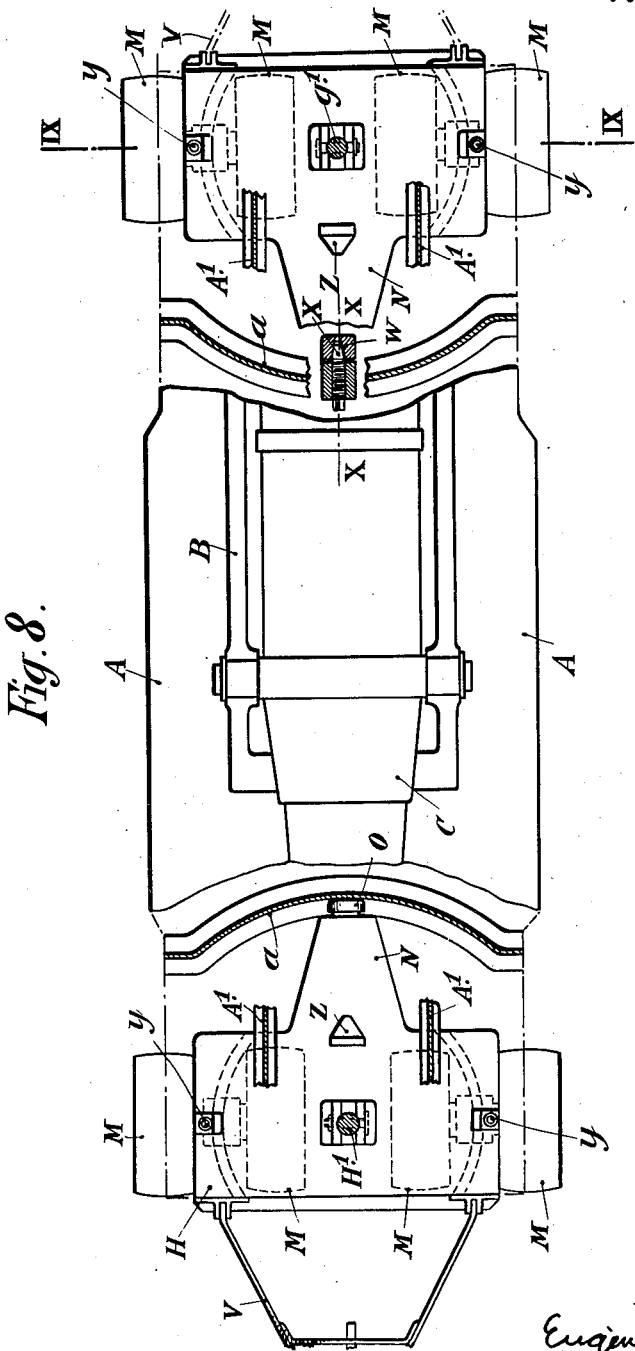

E. SCHNEIDER.
ROAD WHEELED UNIT FOR ARTILLERY AND FOR OTHER PURPOSES.
APPLICATION FILED SEPT. 13, 1918.

1,335,759.

Patented Apr. 6, 1920.
9 SHEETS—SHEET 8.

Inventor.
Eugène Schneider
by,
Mauro, Cameron, Lewis & Massie
Attorneys.

E. SCHNEIDER.
ROAD WHEELED UNIT FOR ARTILLERY AND FOR OTHER PURPOSES.
APPLICATION FILED SEPT. 13, 1918.
1,335,759.
Patented Apr. 6, 1920.
9 SHEETS—SHEET 9.
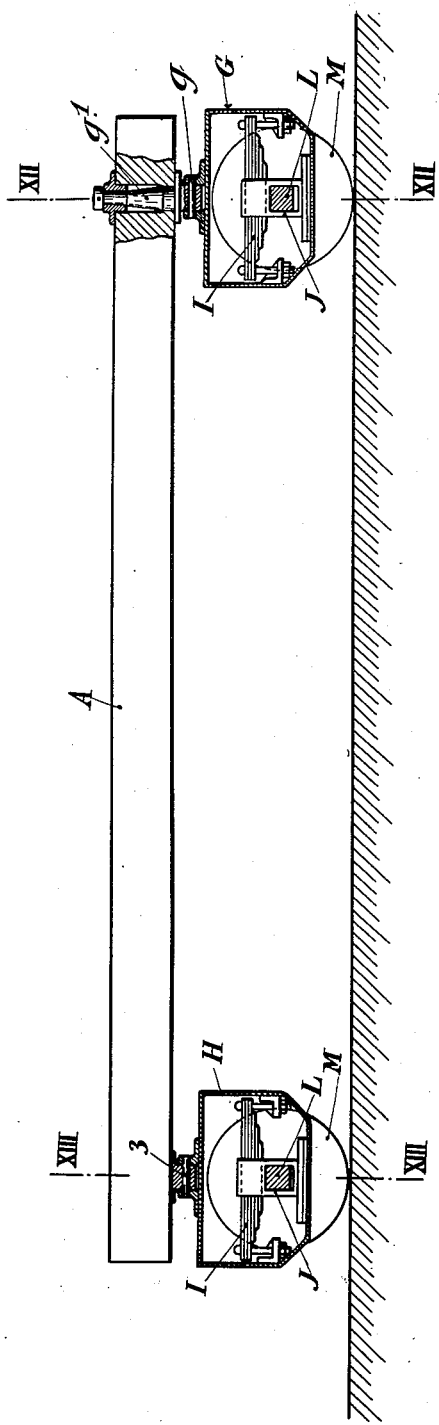
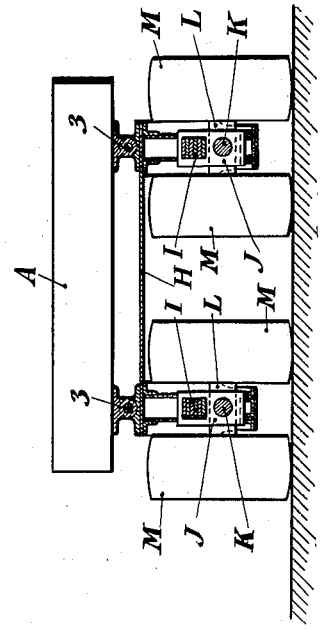
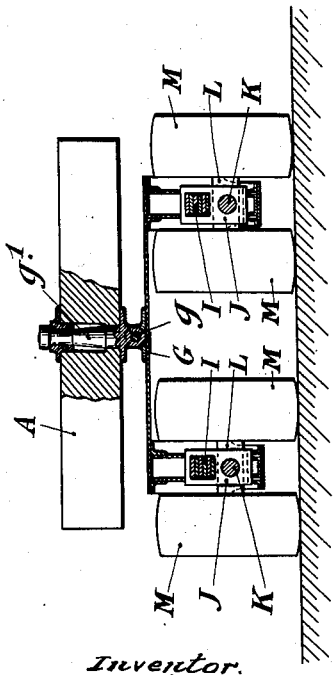

UNITED STATES PATENT OFFICE.

EUGÈNE SCHNEIDER, OF PARIS, FRANCE, ASSIGNOR TO SCHNEIDER & CIE., OF PARIS, FRANCE, A LIMITED JOINT-STOCK COMPANY OF FRANCE.

ROAD WHEELED UNIT FOR ARTILLERY AND FOR OTHER PURPOSES.

1,335,759.      Specification of Letters Patent.      Patented Apr. 6, 1920.

Application filed September 13, 1918. Serial No. 253,988.

*To all whom it may concern:*

Be it known that I, EUGÈNE SCHNEIDER, a citizen of the French Republic, and a resident of 42 Rue d'Anjou, Paris, France, have invented a new and useful Improvement in and Relating to Road Wheeled Units for Artillery and for other Purposes, which invention is fully set forth in the following specification.

This invention has for its object to provide an improved construction of road wheeled units for artillery and for other purposes.

According to this invention each road wheeled unit consists of an auxiliary frame adapted to be fitted to the undercarriage frame of the vehicle, to which it is to be applied, in various ways according as the said unit is to be employed as a front unit or as a rear unit. The improved unit carries by means of elastic suspensory devices, such as leaf springs, for instance, two boxes or other suitable supports to which axles of suitably reduced length provided with a wheel at each end are jointed so as to be capable of turning on pivots situated parallelly to the longitudinal axis of the unit frame.

When the improved unit is intended to be used as a front unit, its frame is provided on its upper side with a projecting vertical pivot arranged at equal distances from the suspensory devices for the axles, and designed to fit in a corresponding lodgment in the carriage frame. As an alternative this pivot may be jointed to the unit frame so as to rotate thereon about a horizontal axis around which the unit frame can then rock relatively to the carriage frame. This property of the unit frames of being able to rock, together with the oscillations which its axles may have relatively to itself, allows the wheels of the road units to adapt themselves to the most varied transverse contours of the road.

The improved road units or their frames are preferably constructed in such a manner as to be adapted to be connected quickly to the carriage frame and to be adapted also if required to be readily detached therefrom. This construction is preferably employed when the invention is applied to artillery intended to travel on and fire from a rail track. In that case the improved road units constitute auxiliary units adapted to be fitted to the carriage frame of the gun or vehicle for the purpose of traveling on the road. In such case they may also be constructed in such a manner as to remain attached to the gun carriage, especially during firing, when this takes place on a special track provided for the purpose.

Several practical constructions for carrying into effect and applying this invention are illustrated in the accompanying drawings in which:

Fig. 1 is a side elevation partly in section of a gun carriage (adapted to fire from a special rail track) provided with the invention, the gun carriage being shown arranged for traveling and for firing on the said track.

Fig. 2 is a similar elevation showing the gun carriage arranged for traveling on roads.

Fig. 3 is a plan corresponding to Fig. 2, broken away in parts in order to show the front and rear road units, some parts being shown in section.

Fig. 4 is a vertical cross section drawn to a larger scale; the right hand half of the figure is a section on the line IV—IV of Fig. 1; the left hand half is a section on the line IV—V—V of Fig. 1.

Fig. 5 is a vertical cross section partly in elevation similar to that of Fig. 4, showing the front road unit in one position when traveling over rugged ground.

Fig. 6 is a partial end elevation.

Fig. 7 is a partial vertical section, taken on the line VII—VII of Fig. 4, of a detail.

Figs. 8 to 10 illustrate a second practical form of this invention likewise in its application to a gun carriage adapted to fire from a rail track.

Fig. 8 is a plan, certain parts being broken away to show the improved road units.

Fig. 9 is a vertical cross section drawn to a larger scale, on the line IX—IX of Fig. 8.

Fig. 10 is a partial section, drawn to the same scale as Fig. 9 on the line X—X of Fig. 8, of a detail.

Figs. 11, 12 and 13 illustrate diagrammatically the application of the invention in the case of the improved road units fitted to the carriage frame of any road vehicle.

Fig. 11 is a side elevation partly in section.

Fig. 12 is a vertical cross section on the line XII—XII of Fig. 11, and

Fig. 13 is a vertical cross section on the line XIII—XIII of Fig. 11.

Figure 1:
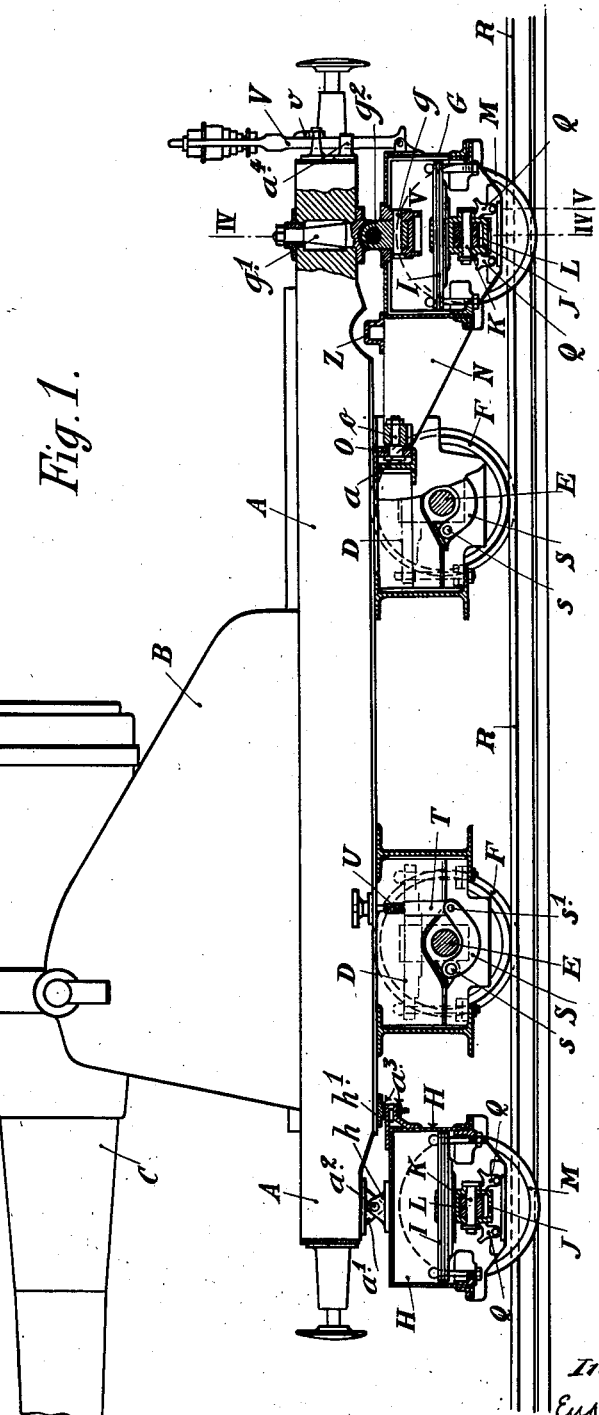
Figures 1 to 7 illustrate a first practical form and a first example of applying the invention.

In these figures, A is the carriage frame, of any suitable construction, of a road vehicle or of a gun carriage adapted to fire from a rail track.

In the examples shown in Figs. 1 to 10, it is to be understood that the gun C, its mount B and the connection between the gun mount B and the gun carriage frame A, may be varied at will.

In these examples it is assumed that the gun carriage frame A is suspended in the usual manner by means of springs D from two axles having wheels adapted to run on rails, each consisting of an axle E and a pair of wheels F, F.

It is to be understood that the carriage frame A may be carried on a variable number of wheeled axles according to the caliber and weight of the gun, and that instead of being carried on simple wheeled axles, it can be mounted on trucks or bogies.

The improved wheeled units forming the subject matter of the present invention are mounted at the ends of the frame A of the gun carriage.

G is the frame of the front road wheeled axles and H is the frame of the rear road wheeled axles. With these frames G and H in their normal positions their longitudinal axes extend parallel with the longitudinal axis of the main frame A.

From the frame G as also from the frame H, there are suspended elastically, for instance by means of springs I carried in downward extensions on the opposite end of the frame, supports such as boxes J each carrying a pivot K that is parallel to the longitudinal axis of the respective frame G or H.

An axle L, adapted to oscillate about each pivot K, carries at its ends the road wheels M.

The boxes J are preferably so arranged that the pivot K will be situated in the plane of the vertical axis of the rails R during the travel of the carriage on a rail track.

The frame G of the front road wheel axles is pivoted to the frame A of the gun carriage by a double pivotal joint comprising a pivot $g$ parallel to the longitudinal axis of the gun carriage and supported by a vertical pivot $g^1$ that is journaled in the carriage frame A.

During the travel of the carriage on the road, the pivot $g$ will allow the road axle frame G to assume a transverse inclination relatively to the carriage frame A (Fig. 5), which inclination, in combination with the possibility of the axles L assuming a transverse inclination relatively to the frame G, will allow the wheels M to remain in contact with a road even of very rugged transverse contour.

In the example shown in Figs. 1 to 7, a rearwardly projecting bracket N is provided on the frame G.

This bracket is provided at its free end with a longitudinal pivot $o$ extending in the prolongation of the pivot $g$ and carrying a member, such as a roller O, working in a guide $a$.

This guide is arranged under the carriage frame A and has its center in the geometrical axis of the vertical pivot $g^1$.

Since the pivots $o$ and $g$ are situated in alinement with each other, their common geometrical axis will constitute an axis for the transverse pivotal movement of the frame G.

The guiding of the frame G by means of the roller O in the guide $a$, gives a double advantage. It allows of assembling the frame G to the pivot $g^1$ by means of a transverse pivot $g^2$ which considerably facilitates the mounting of the road wheel axle frame. When the vehicle is traveling on a road the pivot $g^2$ will allow of a slight oscillation of the frame G in the longitudinal direction, thereby preventing any excessive shearing strain on the pivot $g^1$ when passing over obstacles met by the wheels M in that direction.

The inner end $l$ of each of the axles L of the front wheel units and rear wheel units is maintained in a guide groove P formed in or on the frame G.

This guidance prevents any twisting strain on the pivot K and at the same time its upper and lower ends constitute stops for limiting the pivotal movements of the axle about the said pivot.

Figure 7:
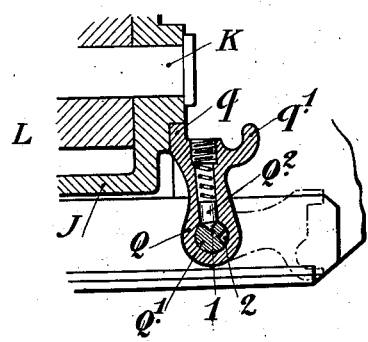

During the firing and travel of the gun on the special rail track, the suspension springs of the axles L are supported by spring brackets Q illustrated in detail in Fig. 7.

These brackets Q are adapted to turn about a fixed pivot $Q^1$ carried by the unit wheel frame G or H and therefore they can be brought at will into the position of use shown in full lines in Fig. 7 or into their inoperative position indicated by dot and dash lines in the same figure.

In the position of use, the ridge $q$ which constitutes the bracket proper engages under the supporting box J of the pivot K.

To bring it into its inoperative position it is merely necessary to turn the bracket down by pulling the hook $q^1$; the spring bolt $Q^2$ will then be forced out of its socket 1 in the pivot $Q^1$.

When the said bolt is engaged in the socket 2, the bracket is held fast in the position shown in dot and dash lines.

Figure 2:
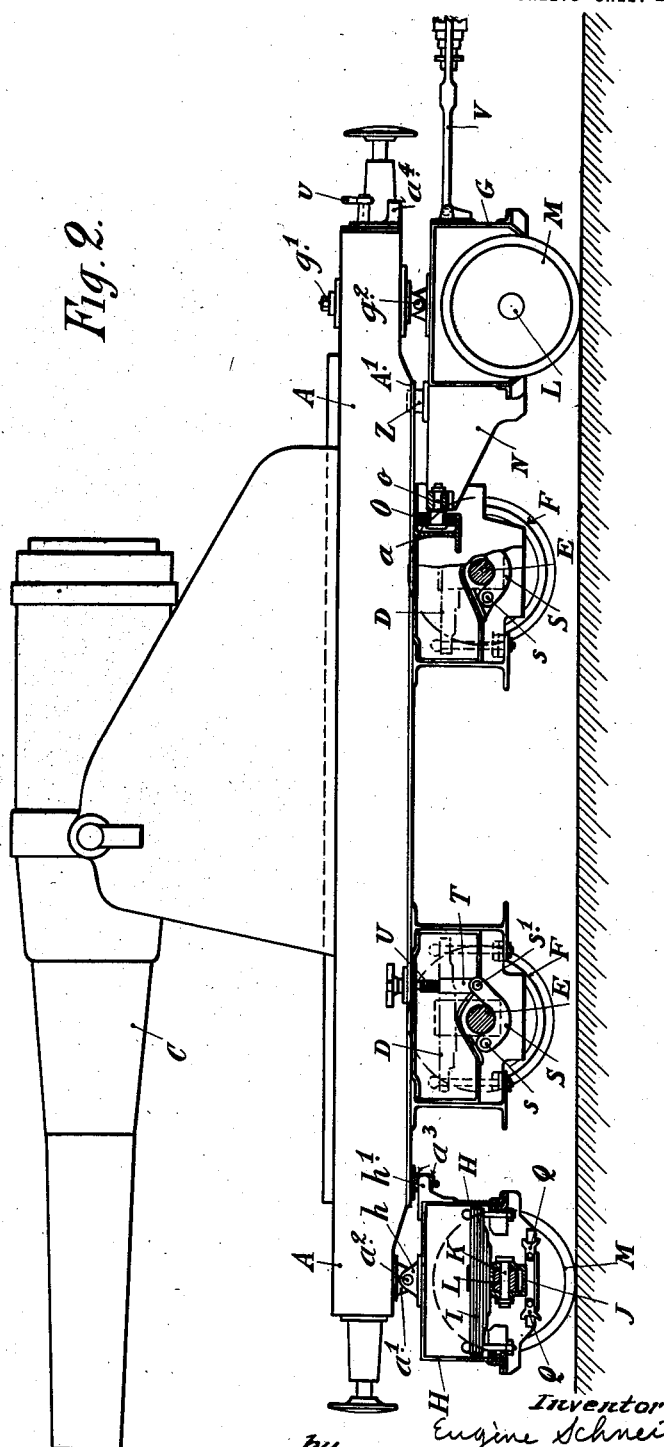
Figure 3:
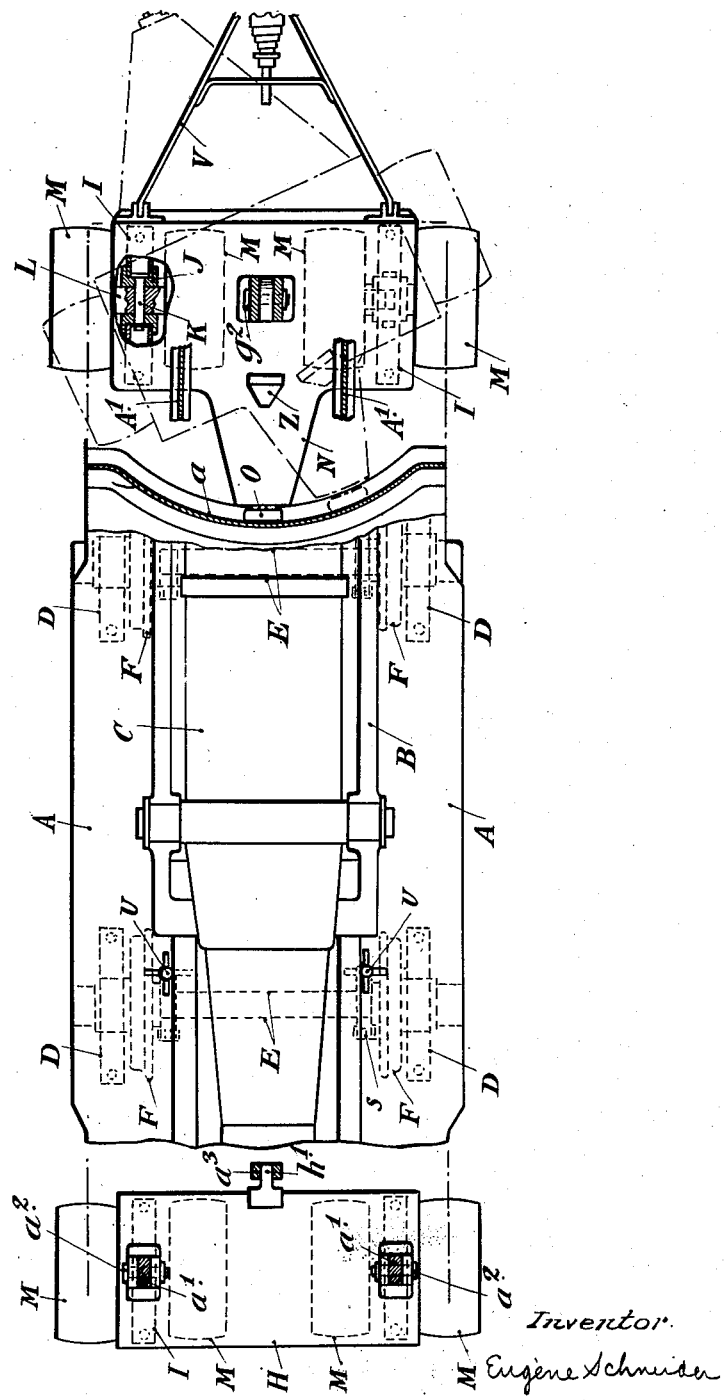
Figure 4:
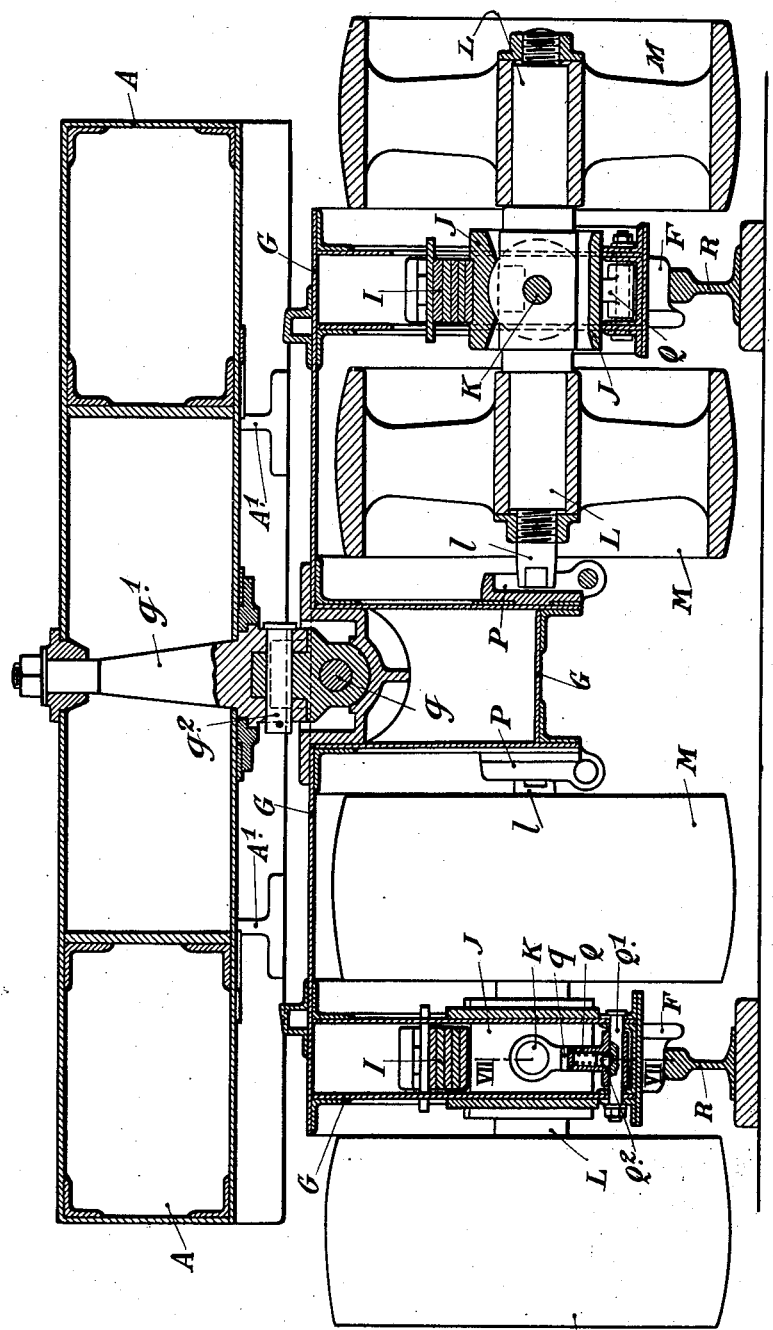
Figure 5:
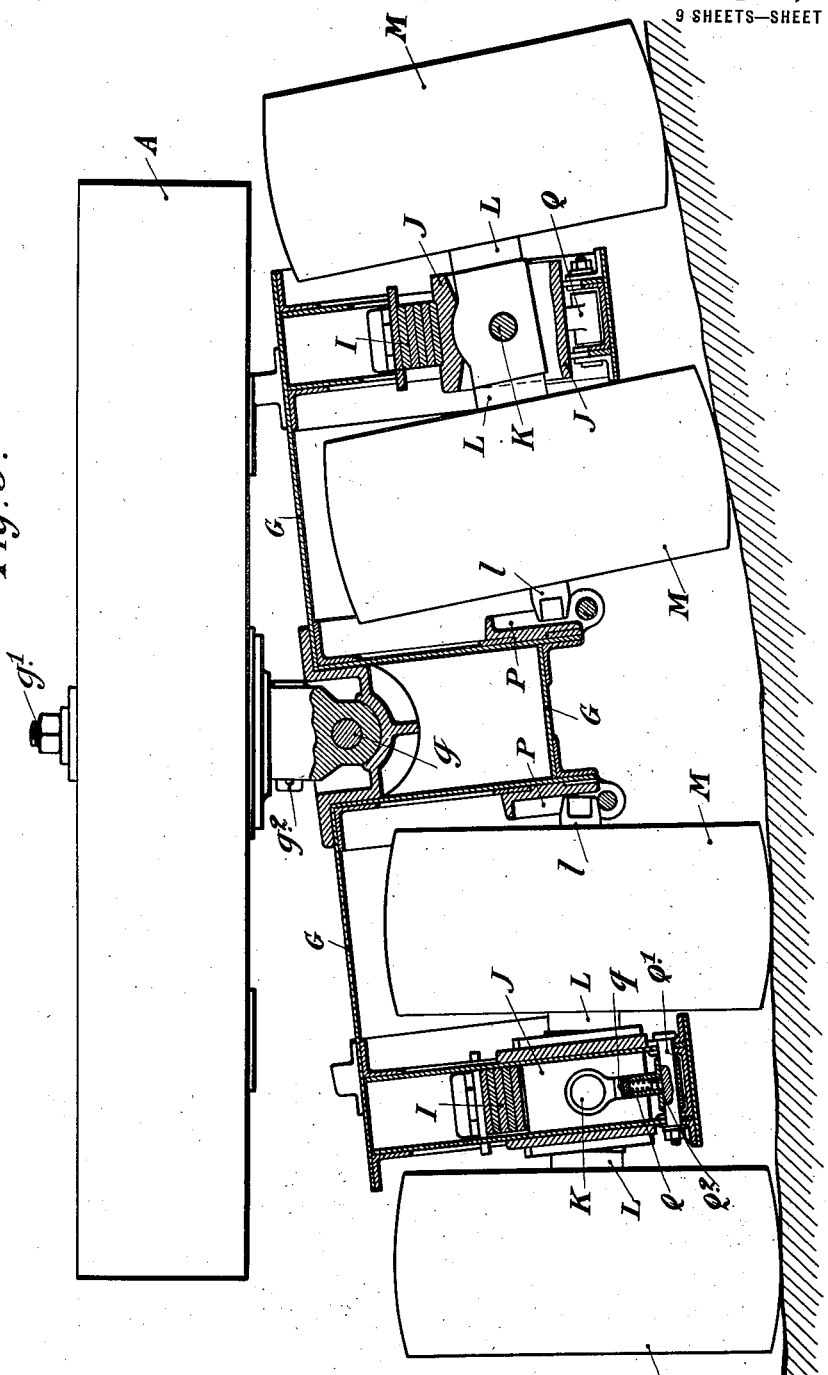

The suspension springs D of the rail track wheeled units may be retained during the travel on roads respectively in the position of non-use and use by means of the devices shown in Figs. 1 and 2.

These devices consist simply in a pair of half supporting collars S for each axle. These half collars S are pivoted at one end $s$ to the unit frame and at their other end $s^1$ to an internally screw-threaded sleeve T in which works a screw-threaded rod U movable in the carriage frame A. By rotating the rod U in one or the other direction, the joint $s^1$ is raised or lowered and thereby the half collars S can be brought into the position of use shown in Fig. 2 or into the position of non-use shown in Fig. 1.

In the example shown in Figs. 1 to 6, the rear unit frame H is connected to the carriage frame A in such a manner as not to be able to have any oscillation either in the transverse or longitudinal direction. This connection is effected, as shown in elevation in Figs. 1 and 2 and in plan in Fig. 3, by means of lugs $a^1$ which are provided under the carriage frame A, said lugs being held by pins $a^2$ in blocks $h$ in the unit frame H. The unit frame H carries in the plane of its transverse axis, a stud $h^1$ engaged in an eye $a^3$ fixed to the underside of the carriage frame A. This connection constitutes at the same time a convenient means for mounting the unit frame H without requiring the carriage frame A to be raised. It is merely sufficient to roll the rear unit-frame under the carriage frame A in such a manner as to cause the stud $h^1$ to enter to its fullest extent into the eye $a^3$ and then to insert the pins $a^2$ in their places.

Figure 6:
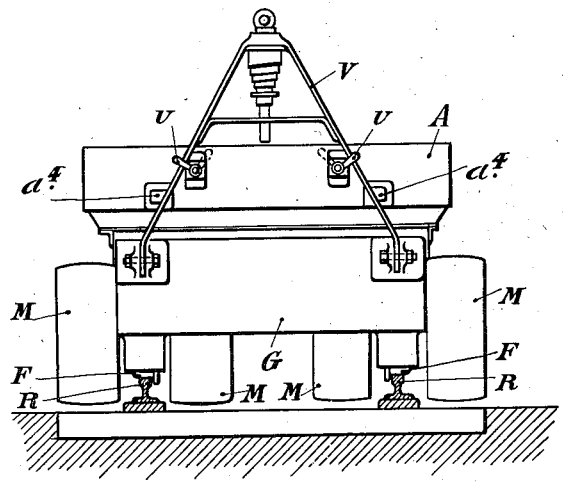

The front wheeled unit G is provided, for the purpose of being yoked to a tractor for road transport, with a traction yoke V. This traction yoke may, for travel on a rail track, be turned up into the position indicated in Fig. 6, in which position it can be fixed by any suitable locking means. In the example shown, this locking means consists of latches $v$ pivoted to the carriage frame A. These latches are shown in Fig. 6 in full lines in their position of use and in dot and dash lines in their inoperative position to allow of turning down the traction yoke. In the raised position of the yoke all transverse movement of the latter, and of the front wheeled unit G to which it is connected, may be prevented by stops $a^4$ provided on the front cross beam of the carriage frame A.

Figure 10:
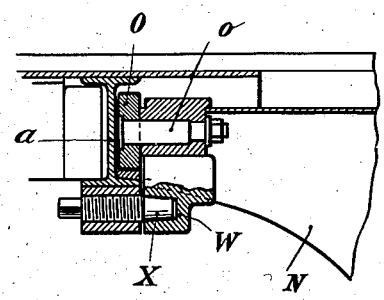
Figure 9:
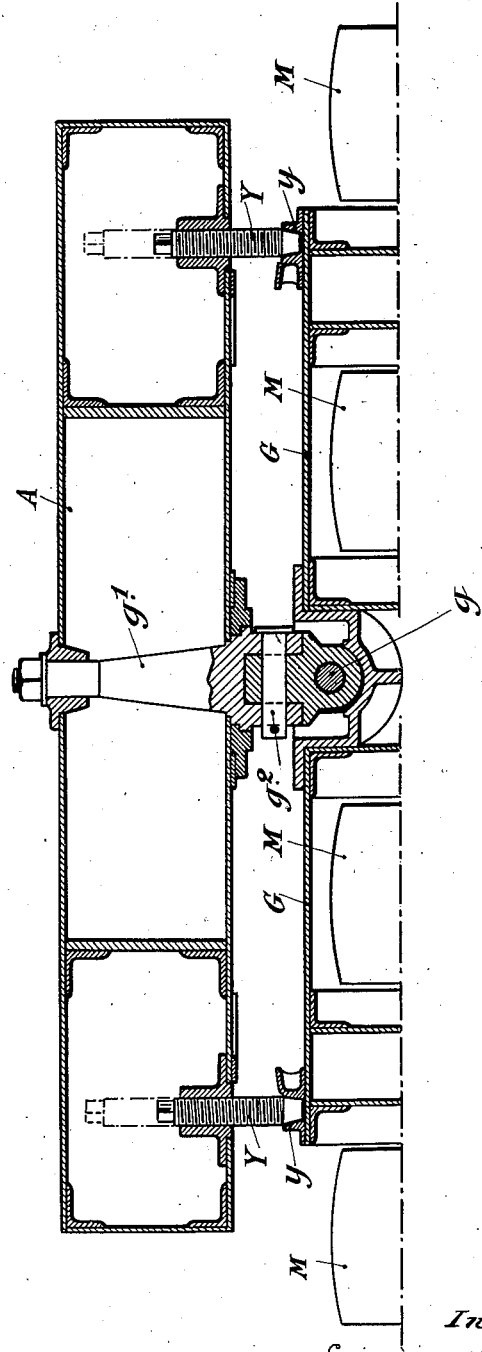

In the construction shown in Figs. 8 to 10, the front and rear wheeled unit frames are alike, so that either can serve at will as a front unit or as a rear unit.

For this purpose the two wheeled units are each provided with a bracket N provided with a guide roller O working in a circular guide track $a$ on the frame A. The said bracket is formed adjacent the axle $o$ of the guide roller with a socket W adapted to receive a bolt X carried by the carriage frame A. The engagement of the bolt X in the socket W prevents any pivotal movement of the frame about the vertical pivot $g^1$ or $h^1$ respectively. On the other hand, all transverse oscillation of the unit frame is prevented by bolts Y which are movable in the carriage frame A and which are adapted to be engaged in corresponding sockets $y$ provided in the unit frame G or H.

The front wheeled unit in the construction shown in Figs. 1 to 6, and both wheeled units in the construction shown in Figs. 8 to 10, may be provided in the plane of the axis of the frame with a stop Z to coöperate with stops, for limiting the rotation of the unit frame about the pivot $g^1$ or $H^1$, constituted by the longitudinals $A^1$ of the carriage frame A.

The invention may be applied to any road vehicle or to any rail track vehicle which is intended to travel if necessary on roads.

Figs. 11 to 13 show the application of this invention to a road vehicle.

In this application, as in the preceding examples, the wheeled unit frames G, H are employed and each carries, through the medium of suspensory springs I, two boxes J to which are pivoted on pivots K, parallel to the longitudinal axis of the carriage frame A, axles L of reduced length provided with a wheel M at each end.

The front unit frame G is jointed by means of a pin $g$ to a vertical pivot $g^1$.

The rear unit frame H may be connected to the carriage frame A, for instance by means of two pivots 3, 3 parallel to the longitudinal axis of the vehicle, for which supporting lugs are provided on the carriage frame A and on the unit frame respectively.

What I claim and desire to secure by Letters-Patent of the United States is:—

1. A road wheeled unit for artillery and for other purposes comprising a unit frame connected to the carriage frame and provided by means of elastic suspension devices with suitable supports to which are jointed, by means of pivots parallel to the longitudinal axis of the frame, axles of suitably reduced length provided with a wheel at each end.

2. A road wheeled unit for artillery and other purposes comprising a unit frame for attachment to the carriage frame, two relatively short axles pivoted to the opposite ends of the unit frame to oscillate independently of each other in the same vertical plane and with the axes of their pivots extending parallel to the longitudinal axis of the unit frame, and a wheel on each end of each axle.

3. A road wheeled unit for artillery and other purposes comprising a unit frame, means for attaching said frame to the carriage frame including a vertical pivot, relatively short axles provided with a wheel at each end carried by said unit frame, and a pivot parallel to the longitudinal axis of the unit frame in the connection of each axle to said frame.

4. A road wheeled unit for artillery and other purposes comprising a unit frame, means for attaching said frame to the carriage frame including a pivot parallel to the longitudinal axis of said unit frame, relatively short axles, provided with a wheel at each end carried by said unit frame, and a pivot parallel to the axis of said unit frame in the connection of each axle to said frame.

5. A road wheeled unit for artillery and other purposes comprising a unit frame, means for attaching said unit frame to the carriage frame including a vertical pivot and a pivot parallel to the longitudinal axis of said unit frame, relatively short axles provided with a wheel at each end carried by said unit frame, and a pivot parallel to the longitudinal axis of said unit frame in the connection of each axle to said frame.

6. A road wheeled unit for artillery and other purposes comprising a unit frame, means for attaching said unit frame to the carriage frame including two right-angularly disposed pivots, relatively short axles provided with a wheel at each end carried by said unit frame, and a pivot parallel to the longitudinal axis of said unit frame in the connection of each axle to said frame.

7. A road wheeled unit for artillery and other purposes comprising a unit frame, means for attaching said unit frame to the carriage frame including three right-angularly disposed pivots one of which is parallel to the longitudinal axis of said unit frame, relatively short axles provided with a wheel at each end carried by said unit frame, and a pivot parallel to the longitudinal axis of said unit frame in the connection of each axle to said frame.

8. A road wheeled unit for artillery and other purposes comprising a unit frame, means for attaching said unit frame to the carriage frame including a vertical pivot and a pivot parallel to the longitudinal axis of said unit frame, a bracket on said unit frame, a roller on said bracket having its axis in alinement with the longitudinal pivotal axis of said frame, an arc-shaped guide or track concentric with said vertical pivot with which said roller coöperates, and relatively short axles provided with wheels at each end and pivoted on longitudinal axes to said unit frame.

9. A road wheeled unit for artillery and other purposes comprising a unit frame for attachment to the carriage frame, relatively short axles provided with a wheel at each end carried by said unit frame, a pivot parallel to the longitudinal axis of said unit frame in the connection of each axle to said frame, and a guide on the unit frame for each of said axles to limit the movement thereof.

10. A vehicle provided with wheels for running on a rail track, a road wheeled unit frame attached to the vehicle frame, relatively short axles provided with a road wheel at each end, means for connecting said axles to said unit frame including suspension springs, and means for holding said springs when said unit is not in use comprising spring brackets carried by the unit frame and movable into and out of spring-holding position.

11. A vehicle provided with wheels for running on a rail track, suspension springs in the connections of said wheels to the vehicle frame, a road wheeled unit frame attached to the vehicle frame, relatively short axles provided with a road wheel at each end carried by said unit frame, and means for holding said springs when said rail wheels are not in use comprising members for supporting the axles of said rail wheels and movable on the vehicle frame into and out of axle-supporting position.

12. A vehicle provided with wheels for running on a rail track, a road wheeled unit frame attached to the vehicle frame and provided with wheels for running on a road, suspension springs in the connections of said road wheels to said unit frame, and means on said unit frame for holding said springs when the road wheeled unit is not in use.

13. A vehicle provided with wheels for running on a rail track, suspension springs in the connections of said wheels to the vehicle frame, a road wheeled unit frame attached to the vehicle frame and provided with wheels for running on a road, and means on said vehicle frame for holding said springs when said rail wheels are not in use.

14. A road wheeled unit for artillery and other purposes comprising a unit frame, means for pivotally connecting said unit frame to the carriage frame, relatively short axles provided with a wheel at each end pivoted to said unit frame on longitudinal axes, and means to prevent pivotal movement between said unit frame and said carriage frame.

15. A vehicle for artillery and other purposes comprising front and rear road wheeled unit frames, means for pivotally connecting said unit frames to the vehicle frame, relatively short axles pivotally mounted on each of said unit frames and provided with a wheel at each end, and means to prevent pivotal movement of the unit frame which is serving as the rear unit.

16. A vehicle for artillery and other purposes, comprising front and rear road wheeled unit frames, connections for attaching said unit frames to the vehicle frame including horizontal and vertical pivots, relatively short axles provided with a wheel at each end and pivotally connected to said unit frames, and means on the vehicle frame for preventing horizontal and vertical pivotal movements of either of said unit frames.

17. A vehicle provided with wheels for running on a rail track, a road wheeled unit frame pivotally attached to the vehicle frame and provided with wheels for running on a road, a traction yoke pivotally attached to said unit frame and movable to an inoperative position, means for retaining said yoke in said inoperative position, and means on the vehicle frame coöperating with said yoke in its inoperative position for preventing pivotal movement of said unit frame.

18. A vehicle provided with wheels for running on a rail track, front and rear road wheeled units pivotally attached to said vehicle, and means to prevent pivotal movement of said units when the rail wheels are in use.

19. A vehicle provided with wheels for running on a rail track, front and rear road wheeled unit frames attached to the vehicle frame and provided with wheels for running on a road, suspension springs in the connections of each of said wheels, and means for holding the springs of either said rail wheels or said road wheels when such wheels are not in use.

20. A vehicle provided with wheels for running on a rail track, front and rear road wheeled unit frames attached to the vehicle frame, relatively short axles provided with a road wheel at each end carried by said unit frames, and a pivot parallel to the longitudinal axis of the unit frame in the connection of each axle to said frame.

21. A vehicle provided with wheels for running on a rail track, front and rear road wheeled unit frames, means for attaching said unit frames to the vehicle frame including a pivot parallel to the longitudinal axis of its unit frame, and relatively short axles provided with a road wheel at each end pivotally mounted on said unit frames on longitudinal axes.

22. A road wheeled unit for artillery and other purposes comprising a unit frame for attachment to the carriage frame having downward extensions at its opposite ends, a box supported by each downward extension, a relatively short axle carried by each box having wheels on its opposite ends and on opposite sides of the downward extension supporting said box, and a pivot parallel to the longitudinal axis of the unit frame connecting each axle with its box.

In testimony whereof I have signed this specification.

EUGÈNE SCHNEIDER.

Witnesses:
 ANDRÉ MOSTICKER,
 JOHN F. SIMONS.